US011796411B2

(12) United States Patent
Hsieh et al.

(10) Patent No.: US 11,796,411 B2
(45) Date of Patent: Oct. 24, 2023

(54) SENSOR WITH A FLEXIBLE PLATE

(71) Applicant: Gettop Acoustic Co., Ltd., Weifang (CN)

(72) Inventors: Kuan-Hong Hsieh, Taibei (TW); Shih-Chia Chiu, Taibei (TW); Sung-Cheng Lo, Taibei (TW); Bo-Cheng You, Taibei (TW); Chun-Kai Chan, Taibei (TW); Wei-Leun Fang, Taibei (TW)

(73) Assignee: GETTOP ACOUSTIC CO., LTD., Weifang (CN)

( * ) Notice: Subject to any disclaimer, the term of this patent is extended or adjusted under 35 U.S.C. 154(b) by 335 days.

(21) Appl. No.: 17/280,197

(22) PCT Filed: Mar. 25, 2019

(86) PCT No.: PCT/CN2019/079505
§ 371 (c)(1),
(2) Date: Mar. 26, 2021

(87) PCT Pub. No.: WO2020/191576
PCT Pub. Date: Oct. 1, 2020

(65) Prior Publication Data
US 2022/0034740 A1 Feb. 3, 2022

(51) Int. Cl.
*G01L 9/00* (2006.01)
*G01L 19/14* (2006.01)
*H04R 19/04* (2006.01)

(52) U.S. Cl.
CPC ............ *G01L 9/0041* (2013.01); *G01L 19/14* (2013.01); *H04R 19/04* (2013.01); *H04R 2201/003* (2013.01)

(58) Field of Classification Search
None
See application file for complete search history.

(56) References Cited

U.S. PATENT DOCUMENTS

| 9,975,760 B2 * | 5/2018 | Suvanto | B81B 7/008 |
| 9,998,812 B2 * | 6/2018 | Elian | H04R 1/04 |
| 10,605,684 B2 * | 3/2020 | Gritti | G01L 9/0045 |
| 10,623,867 B2 * | 4/2020 | Evans | H04R 19/005 |
| 11,041,744 B2 * | 6/2021 | Seo | H01L 23/02 |
| 11,053,115 B2 * | 7/2021 | Ghidoni | G01J 1/429 |

* cited by examiner

*Primary Examiner* — Peter J Macchiarolo
*Assistant Examiner* — Jermaine L Jenkins
(74) *Attorney, Agent, or Firm* — Andrew C. Cheng

(57) ABSTRACT

A sensor includes a housing having a accommodating room, a flexible plate provided in the accommodating room and moveable to induce a medium pressure change in the accommodating room, and a pressure sensing component for sensing the pressure change. The pressure sensing component and the flexible plate are assembled and moveable together. In the sensor of the present invention, after an external signal to be sensed is transmitted to the sensor, the flexible plate moves to induce air disturbances, and then the pressure sensing component receives a pressure change induced by the air disturbances and performs signal sensing. Compared with the conventional sound sensor, the sensor of the present invention provides no opening communicating with the external environment. Therefore, the impact of foreign objects, noise and other environmental factors on the sensor can be avoided, and the signal generated by the object not to be sensed can be effectively reduced.

20 Claims, 10 Drawing Sheets

SENSOR WITH A FLEXIBLE PLATE

FIELD

The invention relates to a sensor.

BACKGROUND

Where sound sensors and pressure sensors are receiving sound in a noisy environment, it is necessary to use multiple directional microphones in conjunction with certain calculation methods in order to reduce noise interference, but an impact of environmental factors such as noise and entrance of foreign objects cannot be effectively eliminated. Conventional vibration sensors can effectively receive signals generated by an object to be sensed and has an ability of greatly reducing influence of signals generated by objects not to be sensed. However, in order to maintain large signal output and linearity, the conventional vibration sensors are generally designed to sense in a narrow frequency range with poor signal-to-noise ratio.

SUMMARY

In order to overcome the shortcomings of the prior art, an objection of the present invention is to provide a sensor that can effectively reduce signals generated by objects not to be sensed and avoid an impact of environment factors, such as wind shear and entrance of foreign objects, on the sensor.

The present invention is achieved by the following technical solutions:

The present invention provides a sensor, which includes a housing having a accommodating room, a flexible plate that is provided in the accommodating room and can move to cause a medium pressure change in the accommodating room, and a pressure sensing component for sensing the pressure change, wherein the pressure sensing component is mounted on the flexible plate and can move with the flexible plate.

Further, the pressure sensing component electrically connects to the flexible plate.

Further, the sensor further includes a disturbance concentrator protrudingly provided in the accommodating room and spaced oppositely from the pressure sensing component for concentrating air disturbance changes around it, and the pressure sensing component performs a pressure detection by collecting the air pressure change around the disturbance concentrator.

Further, the flexible plate divides the accommodating room into a first room and a second room, such that the first room and the second room are respectively located on two opposite sides of the flexible plate, the pressure sensing component is provided in the first room, and the disturbance concentrator is protrudingly provided in the second room. The flexible plate is provide with a through-hole between the pressure sensing component and the disturbance concentrator, and the pressure sensing component collects the air pressure change around the disturbance concentrator through the through-hole.

Further, the disturbance concentrator has a columnar shape or a block shape.

Further, one end of the flexible plate extends and connects to an inner sidewall of the housing, and the other end thereof is a cantilever end provided in the accommodating room in a cantilever form.

Further, the sensor further includes a limiter arranged in the accommodating room for insulating sound and limiting deformation of the flexible plate. The limiter is disposed close to the cantilever end of the flexible plate and is spaced oppositely from the cantilever end of the flexible plate.

Optionally, both ends of the flexible plate extend and connect to the inner sidewall of the housing; or, the flexible plate includes a mounting portion provided in the accommodating room, two fixing portions both connecting with the inner sidewall of the housing, and at least two elastic connecting portions elastically connecting between the two fixing portions and the mounting portion, respectively, and the pressure sensing component is mounted on the mounting portion.

Further, the sensor further includes a limiter provided in the accommodating room for insulating sound and limiting deformation of the flexible plate, the flexible plate is provided with a through-hole corresponding to the pressure sensing component, the pressure sensing component collects the air pressure changes through the through-hole, and the limiter is disposed close to an edge of the through-hole and is spaced oppositely form the edge of the through-hole.

Further, the sensor further includes a conductive pillar provided in the accommodating room.

Further, one end of the conductive pillar connects to the inner wall of the housing, and the other end thereof connects to the flexible plate.

Further, the sensor further includes an inner cover provided in the accommodating room, such that the inner cover is mounted on the flexible plate and is covered outside the pressure sensing component.

Further, the sensor further includes a conductive pillar provided in the accommodating room, such that one end of the conductive pillar connects to an inner wall of the housing, and the other end thereof extends and connects to the inner cover or extends through the inner cover and connects to the flexible plate.

Further, the other end of the conductive pillar and the inner cover are integrally formed or formed separately and then assembled together.

Further, the housing includes a base and an outer cover covered onto the base to define the accommodating room together.

Further, the sensor further includes a conductive pillar provided in the accommodating room, and the outer cover and the conductive pillar are formed integrally or formed separately and then assembled together.

Further, the sensor further includes an inner cover and a conductive pillar provided in the accommodating room, the inner cover is mounted on the flexible plate and covered outside the pressure sensing component, the inner cover, outer cover, base and flexible plate define a filling cavity together, the outer cover is provided with an opening communicating with the filling cavity, and one end of the conductive pillar is positioned corresponding to the opening with a gap formed between the end and the outer cover, while the other end of the conductive pillar connects to the inner cover or connects to the flexible plate after passing through the inner cover, and the filling cavity is filled with a soft material.

Further, the sensor further includes a force-receiving bump, the force-receiving bump is protrudingly provided outside the housing corresponding to the opening, and the conductive pillar extends from the force-receiving bump into the accommodating room.

Further, the sensor further includes a rigid member, and the rigid member is provided between the pressure sensing component and the flexible plate; or the rigid member is provided on a side of the flexible plate facing away from the pressure sensing component; or the rigid members are provided between the pressure sensing component and the flexible plate and on the side of the flexible plate facing away from the pressure sensing component, respectively.

Further, the pressure sensing component includes an integrated circuit chip and a pressure detecting component electrically connecting to the integrated circuit chip, such that the pressure detecting component and the integrated circuit chip are mounted on the flexible plate at a distance, and the pressure detecting component and the integrated circuit chip electrically connect with the flexible plate, respectively.

Further, the pressure detecting component is a microphone or a pressure gauge.

Further, the sensor is a vibration sensor, and the pressure sensing component acts as a mass or an additional mass is provided to increase sensitivity. When external vibration is transmitted to the vibration sensor, due to inertial force, the pressure sensing component leads to a reciprocating motion of the flexible plate, which causes medium disturbances in the accommodating room to induce a pressure change, the pressure sensing component receives the pressure change for performing vibration sensing and outputs a corresponding electrical signal via the flexible plate.

Further, the sensor is a pressure sensor or an underwater sound sensor.

Further, the sensor is a force sensor.

Further, the sensor further includes a limiter protrudingly provided in the second room to limit deformation of the flexible plate.

Further, the flexible plate includes a fixed end connecting to the inner sidewall of the housing and a free end opposite to the fixed end, and the limiter is provided corresponding to the free end of the flexible plate.

Compared with the prior art, the present invention has the following beneficial effects:

In the sensor of the present invention, the flexible plate and the pressure sensing component are located in the accommodating room of the sensor, such that after an external signal to be detected, such as vibration, pressure, sound or force, is transmitted to the sensor, the flexible plate in the accommodating room moves to cause the medium (e.g., the air) disturbances, and then the pressure sensing component receives the pressure change induced by the air disturbance and performs signal sensing. Compared with the conventional sound sensor, the sensor of the present invention provides no opening communicated with the external environment for transmitting sound pressure to sense a sound signal. Therefore, the impact of foreign objects, noise and the other environmental factors on the sensor can be avoided, and thus the influence of the signal generated by the object not to be sensed can be effectively reduced.

Although the vibration sensor can effectively intercept the signal generated by the object to be sensed and greatly reduce the signal generated by the object not to be sensed, the common vibration sensors have the problem of narrow frequency range and poor signal-to-noise ratio. Therefore, in some conventional vibration sensors, the pressure sensing component and the pressure generating component are separately provided to accept air disturbances in order to solve the problems of narrow frequency range and poor signal-to-noise ratio. In the sensor of the present invention, the pressure sensing component is combined with the flexible plate, such that the pressure sensing component can sense the pressure changes on opposite sides of the flexible plate. Compared with the conventional sensor in which the pressure sensing component can sense the pressure change on only one side of the pressure generating component, the sensor of the present invention can effectively improve the sensitivity of the sensor.

In some embodiments, the provision of the rigid plate can relieve the influence of the assembly stress on the structure of the pressure sensing component and improve the sensitivity of the inertial force sensor.

In some embodiments, the provision of the disturbance concentration column may concentrate the pressure difference generated by the flexible plate to the pressure sensing component, thereby improving the sensitivity of the sensor.

In some embodiments, the provision of the limiter may prevent excessive deformation of the flexible plate and play a role in protecting the flexible plate.

DESCRIPTION OF THE EMBODIMENTS

Figure 1:
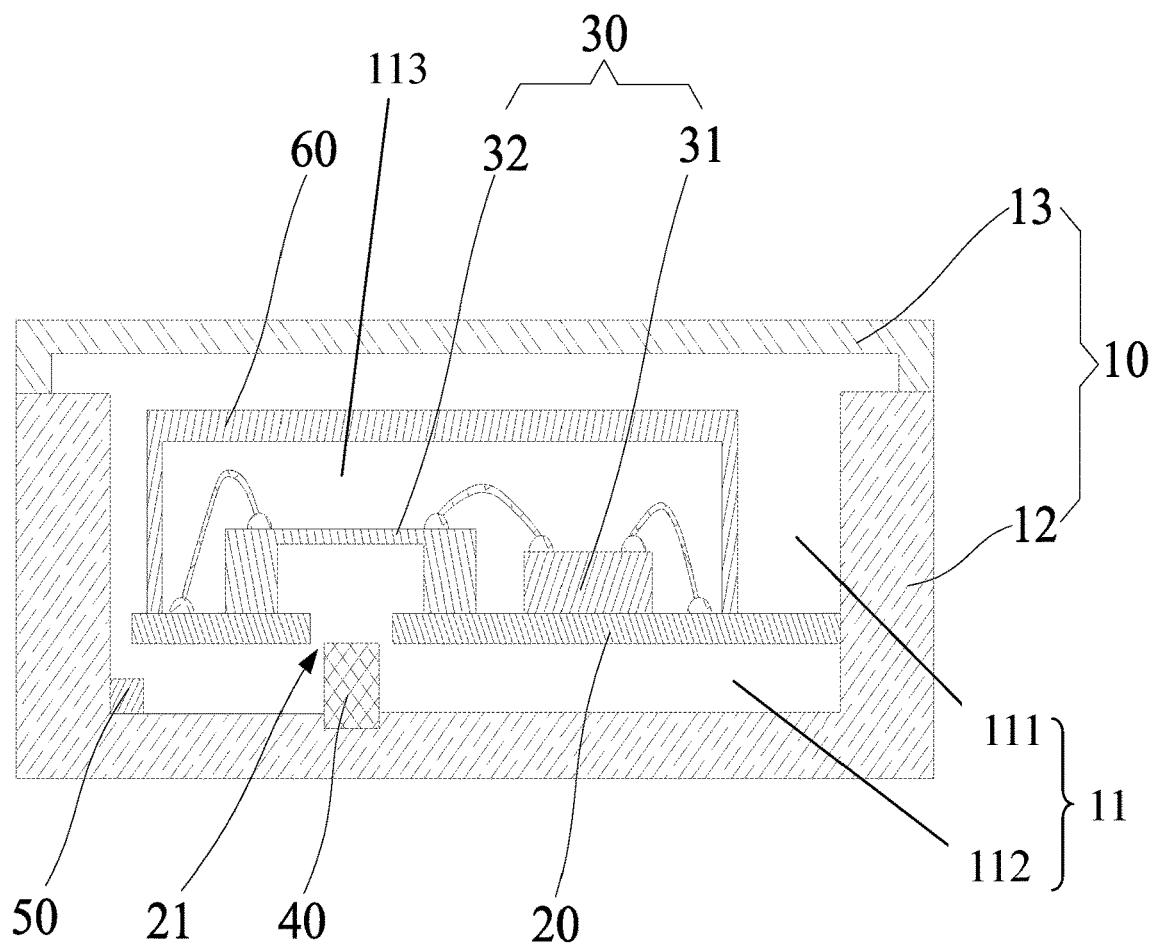
FIG. 1 is a schematic cross-sectional view of a sensor according to Embodiment 1 of the present invention.

Hereinafter, the present invention will be further described with reference to the drawings and specific embodiments.

As shown in FIGS. 1 to 10, a sensor according to some embodiments of the present invention is preferably a vibration sensor, which includes a housing 10 having an accommodating room 11, a flexible plate 20 that is arranged in the accommodating room 11 and moveable to induce a medium (e.g., air) pressure change within the accommodating room 11, and a pressure sensing component 30 mounted on the flexible plate 20 and configured to sense the pressure change induced by disturbances of the medium within the accommodating room 11. The pressure sensing component 30 is mounted on the flexible plate 20 and can move together with the flexible plate 20. In the sensor according to these embodiments of the present invention, the flexible plate 20 moves after receives a signal to be sensed such as a vibration, which results in medium disturbances (e.g., air disturbances) within the accommodating room 11. The pressure sensing component 30 receives pressure change induced by the air disturbances and then performs signal sensing. Compared with the conventional sound sensor, the sensor according to the present invention provides no opening communicated with the external environment for transmitting a sound pressure to sense a sound signal. Therefore, the impact of foreign objects, noise and the other environmental factors on the sensor can be avoided, and thus the influence of signals generated by the objects not to be sensed can be effectively reduced. The flexible plate 20, which acts as a pressure generating element, and the pressure sensing component 30, which acts as a pressure receiving element, are combined together to form an integral structure and may move together. The pressure sensing component 30 is capable of sensing the pressure changes on opposite sides of the flexible plate 20. Compared with the pressure sensing component of the conventional sensor, in which the pressure sensing component may sense the pressure change on only one side of the pressure generating component, the sensor of the present invention can effectively improve sensitivity of the sensor.

In some embodiments, e.g., in inertial force sensors shown in FIGS. 1 to 10, the pressure sensing component 30 may serve as a mass, and of course, an external mass may also be provided to increase sensitivity of the sensor. When external vibration is transmitted to the sensor, due to inertial force, the mass leads to a reciprocation motion of the flexible plate 20, which results in air disturbances. The pressure sensing component 30 receives the pressure change induced by the air disturbances.

It is understandable that the pressure sensing component 30 and the flexible plate 20 are combined together to form an integral structure and can move together, which may be achieved/implemented by the pressure sensing component 30 being directly mounted on the flexible plate 20 or the pressure sensing component 30 being assembled with the flexible plate 20 via other intermediates.

As a preferred embodiment, the flexible plate 20 is electrically connected to the pressure sensing component 30. The flexible plate 20 is a flexible material with electrical wiring, such as a flexible PCB board, a polymer material, a thin film material, or a metal material, etc. The pressure sensing component 30 may output a corresponding electrical signal through the circuit provided on the flexible plate 20 after sensing the pressure change.

It is understandable that the flexible plate 20 may not be provided with electrical wiring, but a circuit board is additionally provided. The pressure sensing component 30 is electrically connected to the additionally provided circuit board and outputs the corresponding electrical signal through the circuit provided on this circuit board.

In a preferred embodiment, the housing 10 includes a base 12 and an outer cover 13. The outer cover 13 is covered onto the base 12 to cooperatively form the aforementioned accommodating room 11, and the flexible plate 20 is connected to an inner sidewall of the base 12. In this embodiment, the outer cover 13 is preferably made of metal material, or it may be made of PCB material.

In a preferred embodiment, the sensor further includes a disturbance concentrator 40 configured to concentrate the air pressure change induced by the air disturbance around the disturbance concentrator 40. The disturbance concentrator 40 is provided in the accommodating room 11 and spaced oppositely from the pressure sensing component 30. The pressure sensing component 30 collects air pressure changes around the disturbance concentrator 40 to perform pressure detection. In a preferred embodiment, the disturbance concentrator 40 has a columnar shape or a block shape. Of course, it is possible not to provide any disturbance concentrator. In addition, the disturbance concentrator 40 being accommodated in the accommodating room 11 is conducive to increasing of sensitivity of the sensor due to the volume of the accommodating room 11 being reduced by the disturbance concentrator 40.

In a preferred embodiment, at least one end of the flexible plate 20 is fixed to the housing 10, e.g., one end of the flexible plate 20 is connected to the inner sidewall of the housing 10, and the flexible plate 20 divides the accommodating room 11 into a first room 111 and a second room 112, such that the first room 111 and the second room 112 are respectively located at opposite sides of the flexible plate 20, the pressure sensing component 30 is provided in the first room 111, and the disturbance concentrator 40 is provided in the second room 112. The flexible plate 20 defines a through-hole 21 located between the pressure sensing component 30 and the disturbance concentrator 40. The disturbance concentrator 40 is preferably cylindrical and is arranged facing and aligned with the through-hole 21. Preferably, the end surface of the disturbance concentrator 40 facing the through-hole 21 is substantially coplanar with the end surface of the flexible plan 20 facing the second room 112. The outer circumferential surface of the disturbance concentrator 40 is adjacent to the inner circumferential surface of the through-hole 21. The pressure sensing component 30 collects the air pressure changes around the disturbance concentrator 40 through the through-hole 21.

In some embodiments, the sensor further includes a limiter 50 provided in the second room 112 to limit deformation of the flexible plate 20. The flexible plate 20 includes a fixed end 25 connected to the inner sidewall of the housing 10 and a free end 26 opposite to the fixed end 25. The free end 26 is an end of the flexible plate 20 with the largest amount of displacement of the flexible plate 20. Preferably, the limiter 50 is arranged at a position corresponding to the free end 27 of the flexible plate 20. Of course, in some embodiments, the limiter 50 may also be arranged at other positions deviating from the free end 27 of the flexible plate 20.

In some embodiments, the pressure sensing component 30 includes an Application Specific Integrated Circuit (ASIC) chip 31 and a pressure detecting component 32 electrically connected to the ASIC chip 31. The pressure detecting component 32 and the ASIC chip 31 are mounted on the flexible plate 20 at a distance, and electrically connected to the flexible plate 20 respectively. The movement of the flexible plate 20 induce an air disturbance, and the pressure detecting component 32 receives the air pressure change induced by the air disturbance and performs signal sensing. Preferably, the pressure detecting component 32 is a MEMS (Micro Electro Mechanical System) microphone or a MEMS pressure sensor, and the through-hole 21 of the flexible plate 20 may be used as a sound inlet facing a front sound cavity of the MEMS structure.

Based on the above technical features, the present invention exemplarily provides the following specific implementations of various sensors, which are described as follows:

Embodiment 1 of Sensor

FIG. 1 is a schematic view of a sensor according to Embodiment 1.

Referring to FIG. 1, in this embodiment, one end of the flexible plate 20 extends and connects to the inner sidewall of the housing 10, and the other end of the flexible plate 20 is a cantilever end. The flexible plate 20 is arranged in the accommodating room 11 in a cantilever form. The sensor further includes an inner cover 60 provided in the first room 111 of the accommodating room 11. The inner cover 60 is mounted on the flexible plate 20 and is covered outside the pressure sensing component 30. A space 113 is formed between the inner cover 60 and the flexible plate 20. The pressure sensing component 30 is accommodated within the space 113 and capable of sensing the air pressure change between the space 113 and the second room 112. Compared with the sensor without use of inner cover, the sensitivity of the sensor using an inner cover 60 can be increased as the volume of the space 113 is less than that of the first room 111. The limiter 50 is disposed close to the free end i.e., the cantilever end 26, of the flexible plate 20, and faces the cantilever end 26 of the flexible plate 20 with a space formed therebetween.

Figure 2:
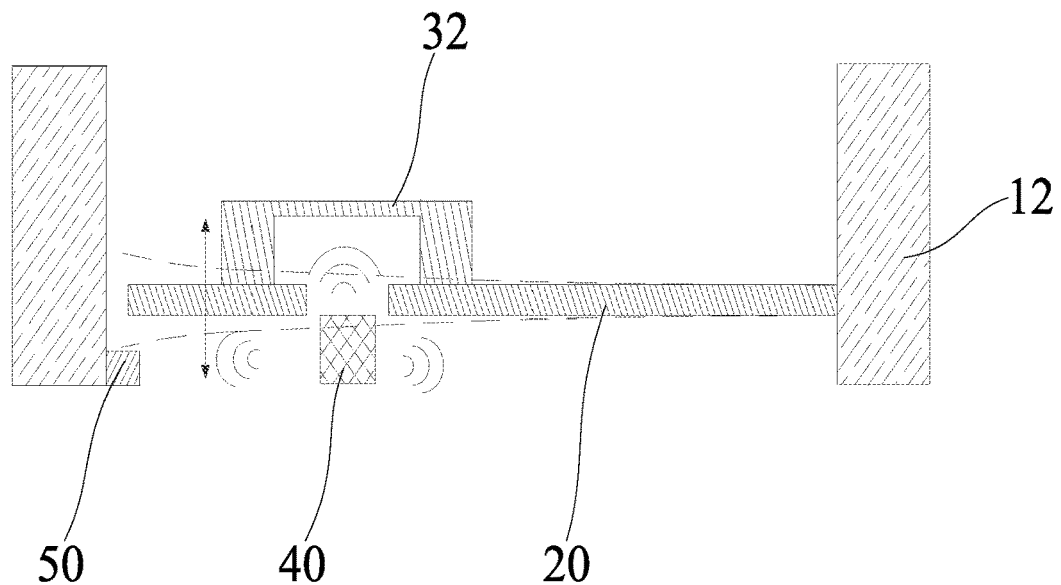
FIG. 2 is a schematic working principle diagram of the sensor according to Embodiment 1 of the present invention.

FIG. 2 is a schematic working principle diagram of the sensor according to Embodiment 1, in which a double arrow line indicates that the flexible plate 20 may vibrate up and down, and dashed lines indicate up and down vibration range of the flexible plate 20.

Referring to FIG. 2, in this embodiment, when external vibration is transmitted to the sensor, the flexible plate 20 does reciprocating motion under an action of inertial force of the inner cover 60 and the pressure sensing component 30, which causes air disturbances around the flexible plate 20, especially around the cantilever end 26 of the cantilever flexible plate 20. The air disturbance induces air pressure changes which are concentrated by the disturbance concentrator 40, and then the air pressure change is received by the pressure detecting component 32.

Preferably, the inner cover 60 is made of metal material, or it may be made of PCB material.

Embodiment 2 of Sensor

Figure 3:
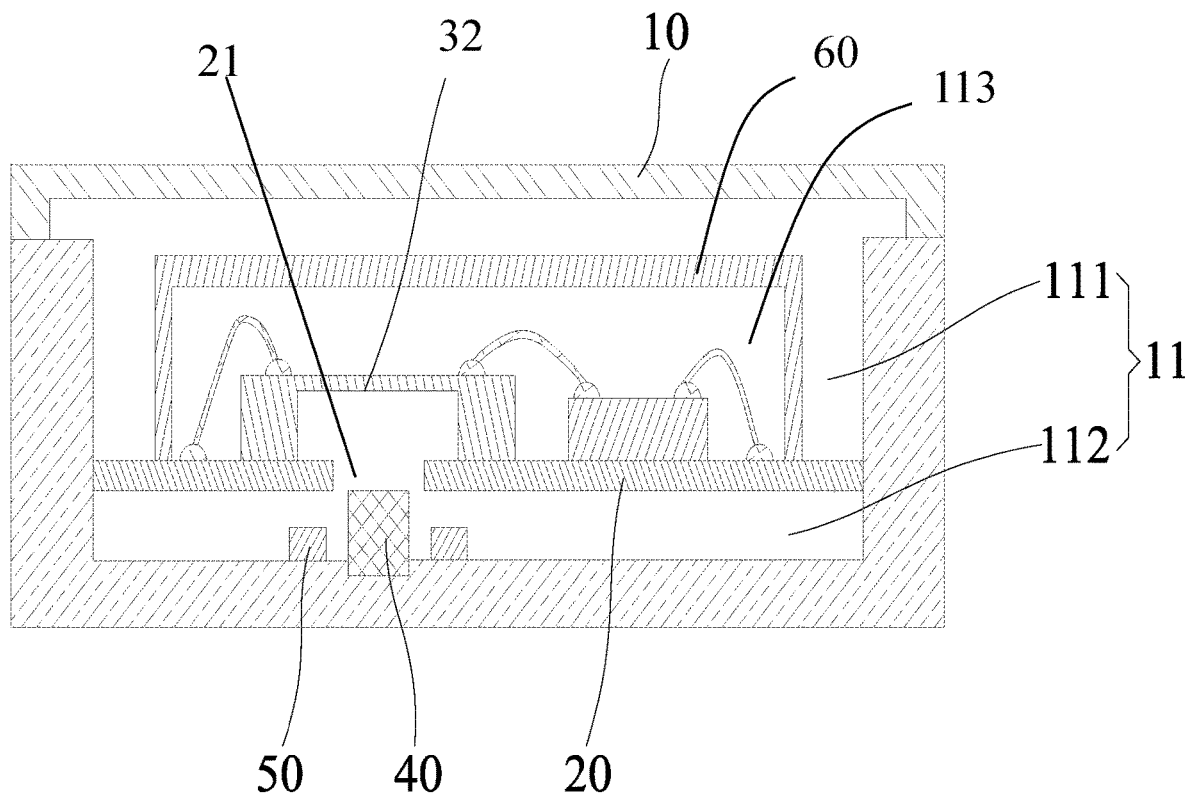
FIG. 3 is a schematic cross-sectional view of a sensor according to Embodiment 2 of the present invention.
Figure 4:
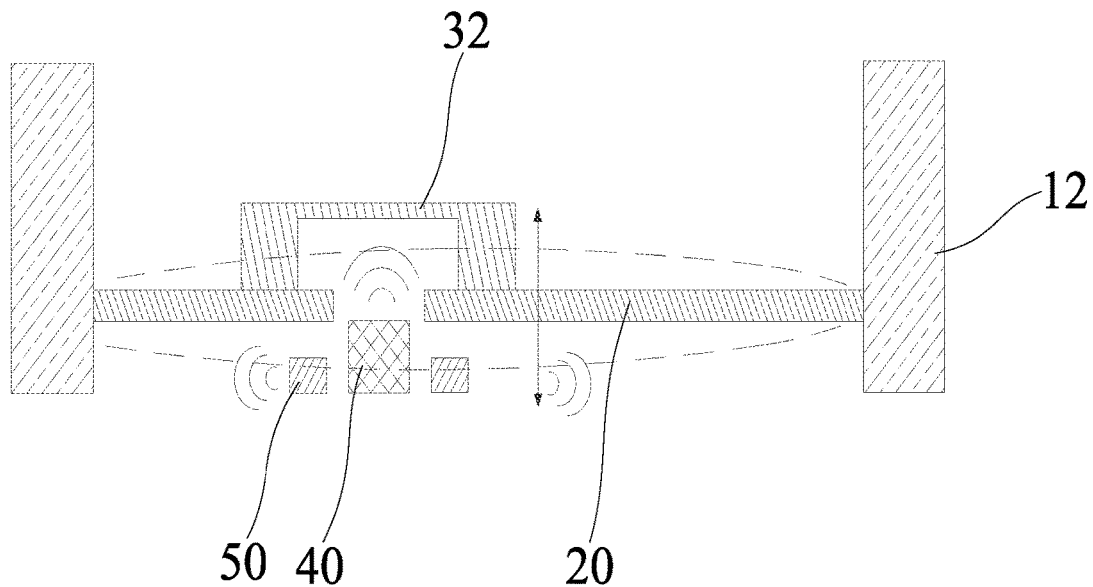
FIG. 4 is a schematic working principle diagram of the sensor according to Embodiment 2 of the present invention.

FIG. 3 is a schematic view of a sensor according to Embodiment 2, and FIG. 4 shows a working principle of the sensor according to Embodiment 2, in which a double arrow line indicates that the flexible plate 20 may vibrate up and down, and dashed lines indicate an up and down vibration range of the flexible plate 20. As shown in FIGS. 3 and 4, the difference between Embodiment 1 and Embodiment 2 lies in that both outer ends of the flexible plate 20 in Embodiment 2 fixedly connect to the inner side wall of the housing 10, and at the same time, the limiter 50 in Embodiment 2 is disposed close to an edge of the through-hole 21 and spaced from the edge of the through-hole 21 at a distance in a vibration direction of the flexible plate 20, wherein the end of the flexible plate 20 defining the through-hole 21 acts as the free end 26.

In this embodiment, the flexible plate 20 does reciprocation motion due to vibration under an action of inertial force of the inner cover 60 and the pressure sensing component 30, which causes air disturbances around the flexible plate 20, especially changes in the air near the through-hole 21 of the flexible plate 20. The disturbance concentrator 40 concentrates pressure change induced by the air disturbance around the disturbance concentrator 40, and then the pressure detecting component 32 receives the pressure change.

Embodiment 3 of Sensor

Figure 5:
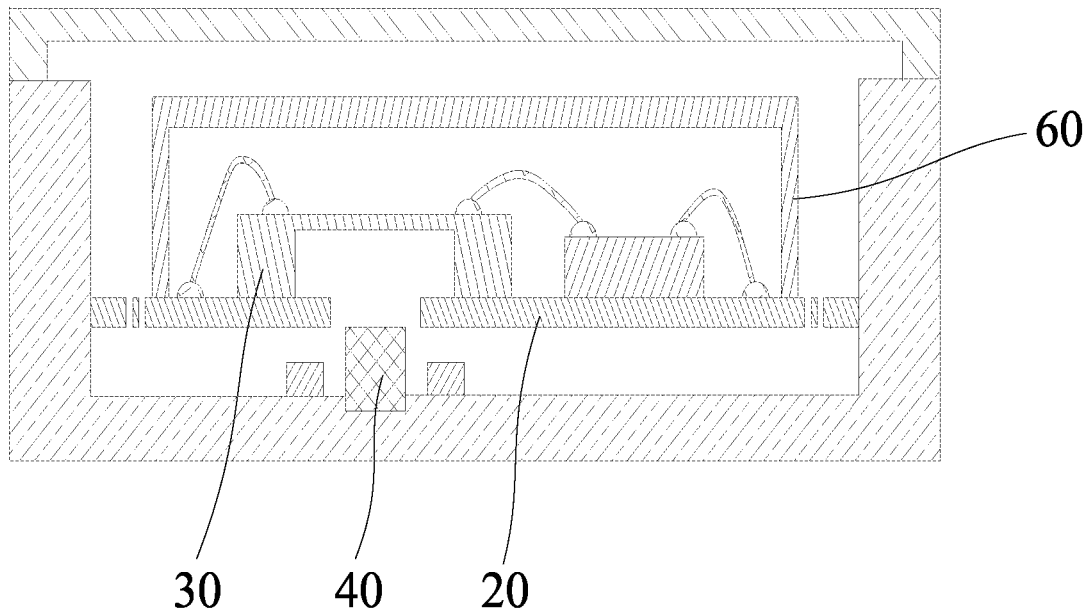
FIG. 5 is a schematic cross-sectional view of a sensor according to Embodiment 3 of the present invention.
Figure 6:
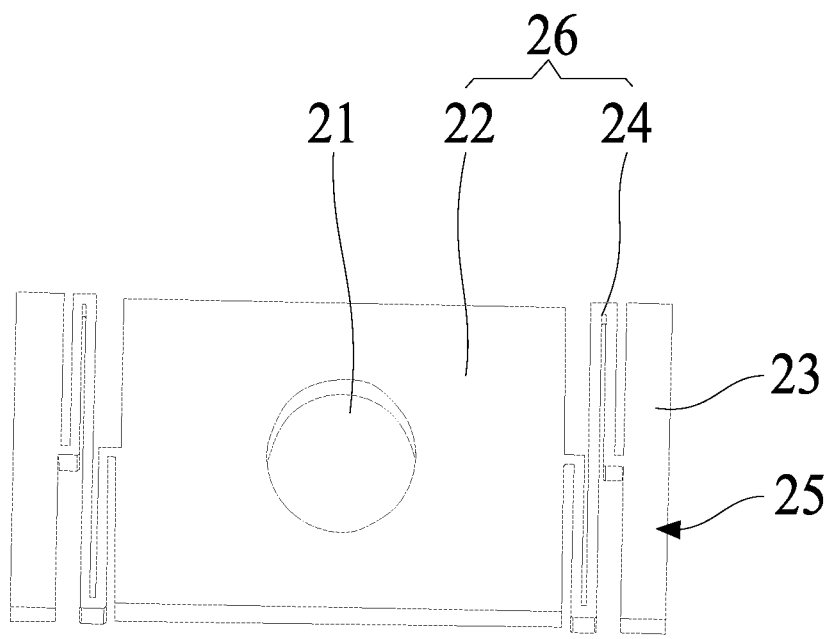
FIG. 6 is a schematic structural view of a flexible plate in the sensor according to Embodiment 3 of the present invention.

As shown in FIGS. 5 and 6, the difference between Embodiment 3 and Embodiment 2 lies in that the structure of the flexible plate 20 is different. The flexible plate 20 in this embodiment has a diaphragm spring structure, and includes a mounting portion 22 provided in the accommodating room 11, two fixing portions 23 both fixedly connected to the inner sidewall of the housing 10, and at least two elastic connecting portions 24 elastically connected between the two fixing portions 23 and the mounting portion 22 respectively. The fixing portion 23 acts as the fixed end 25 of the flexible plate 20, while the mounting portion 22 acts as the free end 26 of the flexible plate 20. The pressure detecting component 30 is mounted on the mounting portion 22.

It can be understood that the sensor of the present invention may be provided with an inner cover 60, or the inner cover may be omitted.

Embodiment 4 of Sensor

Figure 7:
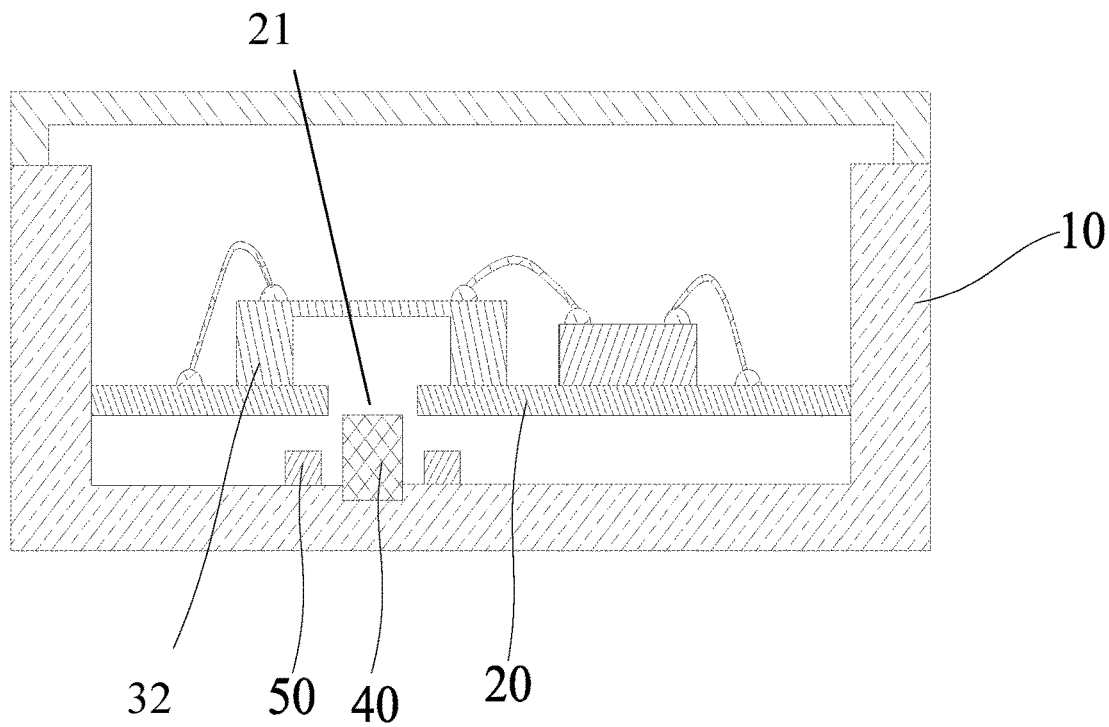
FIG. 7 is a schematic cross-sectional view of a sensor according to Embodiment 4 of the present invention.

As shown in FIG. 7, the difference of Embodiment 4 from Embodiment 2 lies in that the sensor according to Embodiment 4 has no inner cover 60, and the flexible plate 20 does reciprocation motion due to vibration under an action of inertial force of the pressure sensing component 30, which causes air disturbances around the flexible plate 20, especially change in the air near the through-hole 21 of the flexible plate 20. The disturbance concentrator 40 concentrates the air pressure changes induced by the air disturbance around the disturbance concentrator 40, and then the pressure detecting component 32 receives the pressure change, which makes assembly process simpler.

In the sensor of the present invention, a rigid member may be additionally provided to the flexible plate 20.

Embodiment 5 of Sensor

Figure 8:
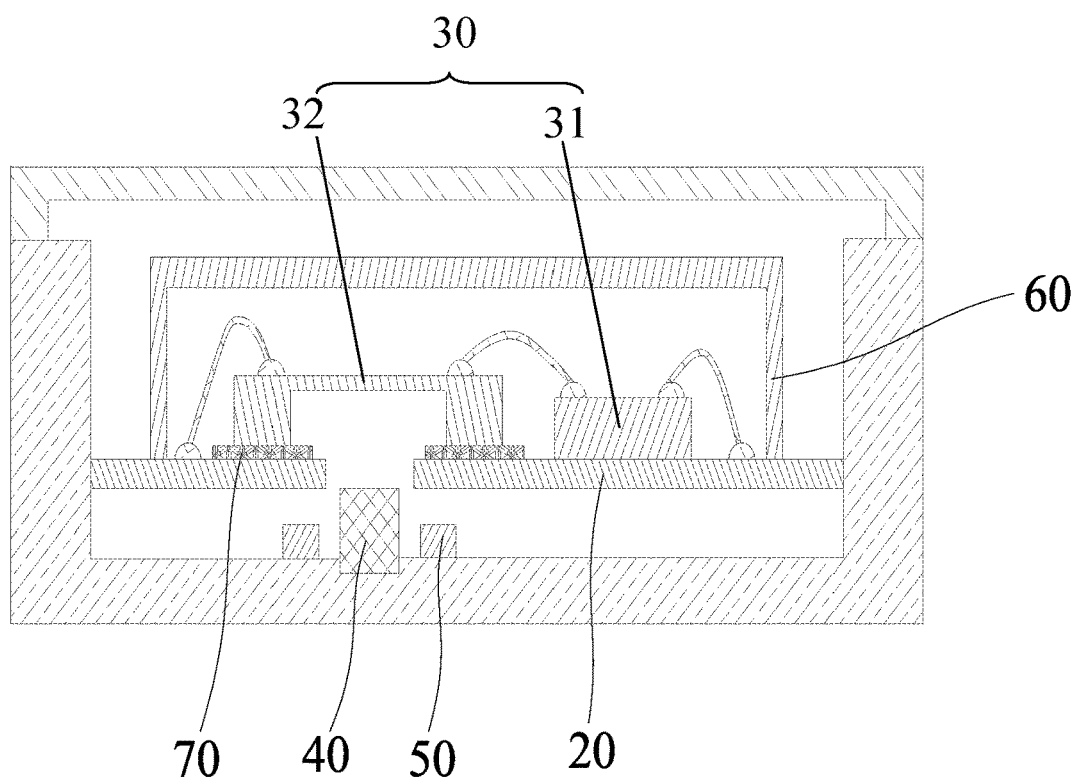
FIG. 8 is a schematic cross-sectional view of a sensor according to Embodiment 5 of the present invention.

As shown in FIG. 8, the flexible plate 20 will deform when it resonates with an external vibration source such that stress influence are brought to the pressure detecting component 32, which may change a rigidity of the diaphragm in the pressure detecting component 32 or change a sensing gap and thus cause sensitivity drift, therefore, in Embodiment 5, a rigid member 70 is additionally provided based on Embodiment 2. The rigid member 70 is arranged between the pressure sensing component 30 and the flexible plate 20. The rigid member 70 may relieve the influence of the assembly stress on the pressure detecting component 32 and improve the mass of the flexible plate 20 to increase the sensitivity.

In this embodiment, the rigid member 70 may be made of stainless steel, FR4 (glass fiber epoxy copper clad laminate fire-resistant material), PI (polyimide), or metal blocks and so on.

Embodiment 6 of Sensor

Figure 9:
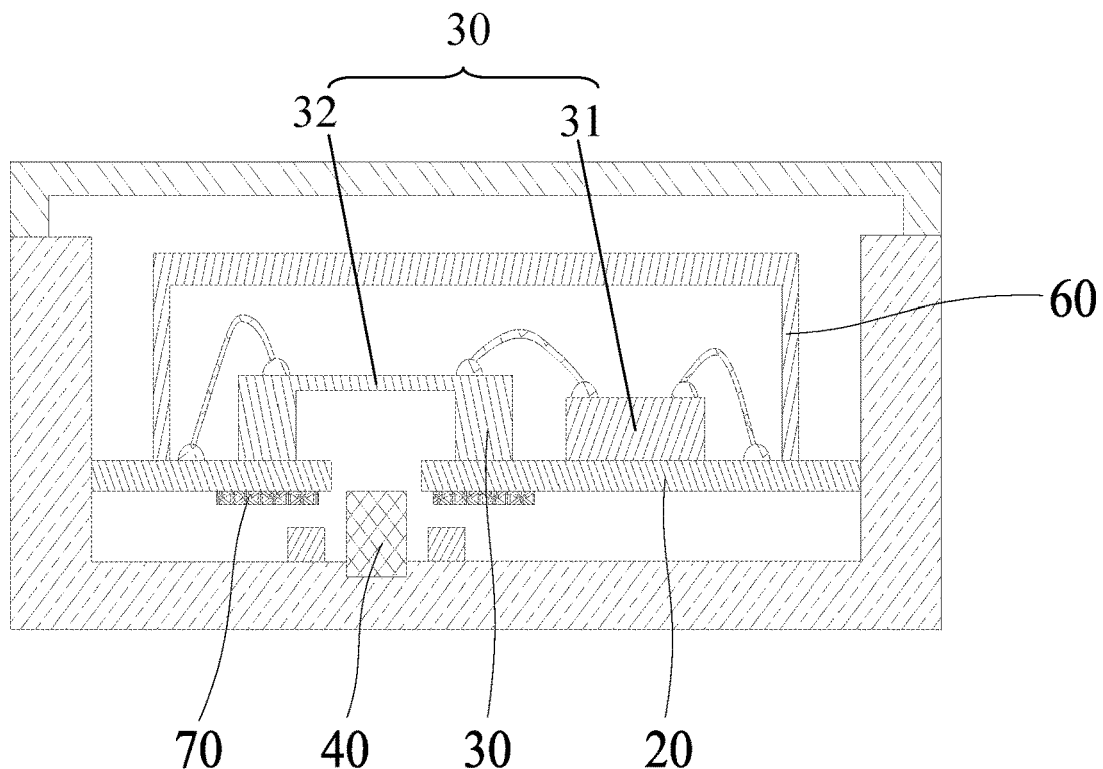
FIG. 9 is a schematic cross-sectional view of a sensor according to Embodiment 6 of the present invention.

As shown in FIG. 9, the difference of Embodiment 6 from Embodiment 5 lies in that the position of the rigid member 70 is different. Specifically, in this embodiment, the rigid member 70 is provided on a side of the flexible plate 20 facing away from the pressure sensing component 30, with the rigid member 70 having the same function as that of Embodiment 5.

Embodiment 7 of Sensor

Figure 10:
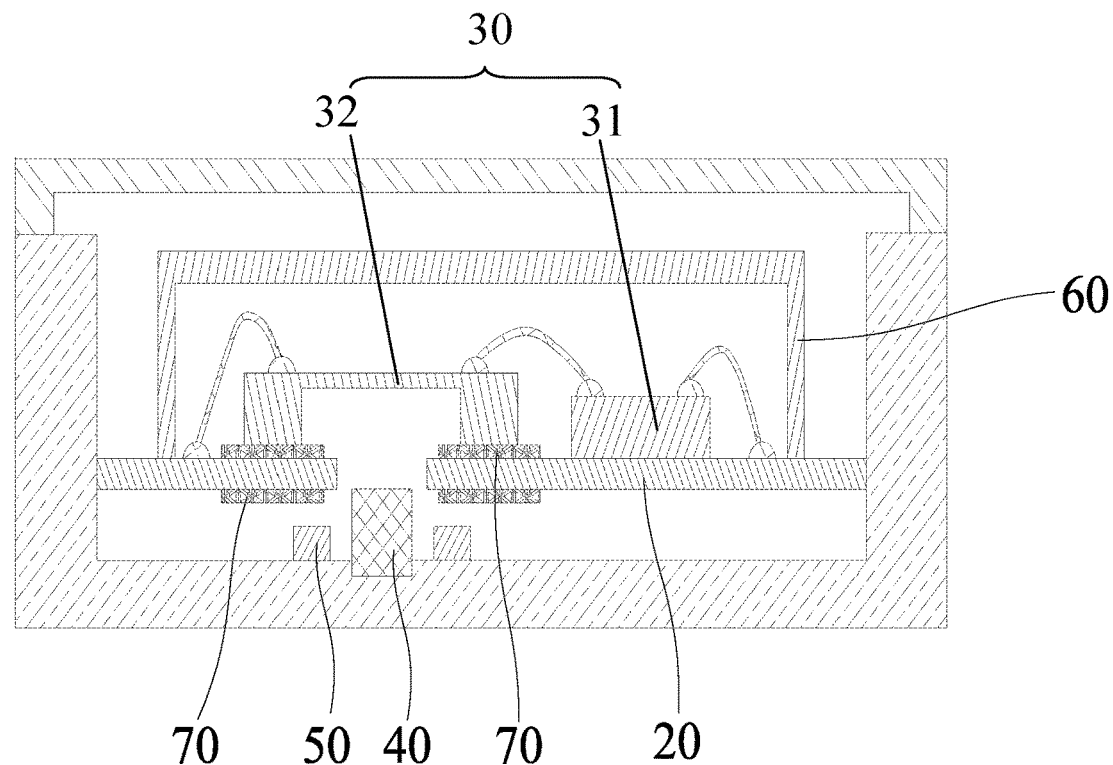
FIG. 10 is a schematic cross-sectional view of a sensor according to Embodiment 7 of the present invention.

As shown in FIG. 10, the difference of Embodiment 7 from Embodiment 5 lies in that the number and position of the rigid members 70 are different. Specifically, in this embodiment, the sensor includes two layers of rigid members 70, and the two layers of rigid members 70 are respectively arranged between the pressure sensing component 30 and the flexible plate 20 and on the side of the flexible plate 20 facing away from the pressure sensing component 30, with the rigid member 70 having the same function as that of Embodiment 5.

The sensors according to the above Embodiments 1-7 use the flexible plate 20 to resonate with external vibration, thereby generating a larger signal output and linearity, and transmitting the vibration signal to the pressure sensing component 30 for vibration signal sensing applications. This technical solution may be applied to bone conduction voice pick up technology, which may effectively shield the interference of low-frequency environmental noise.

In the sensor of the present invention, a conductive pillar may also be provided in the accommodating room.

Embodiment 8 of Sensor

Figure 11:
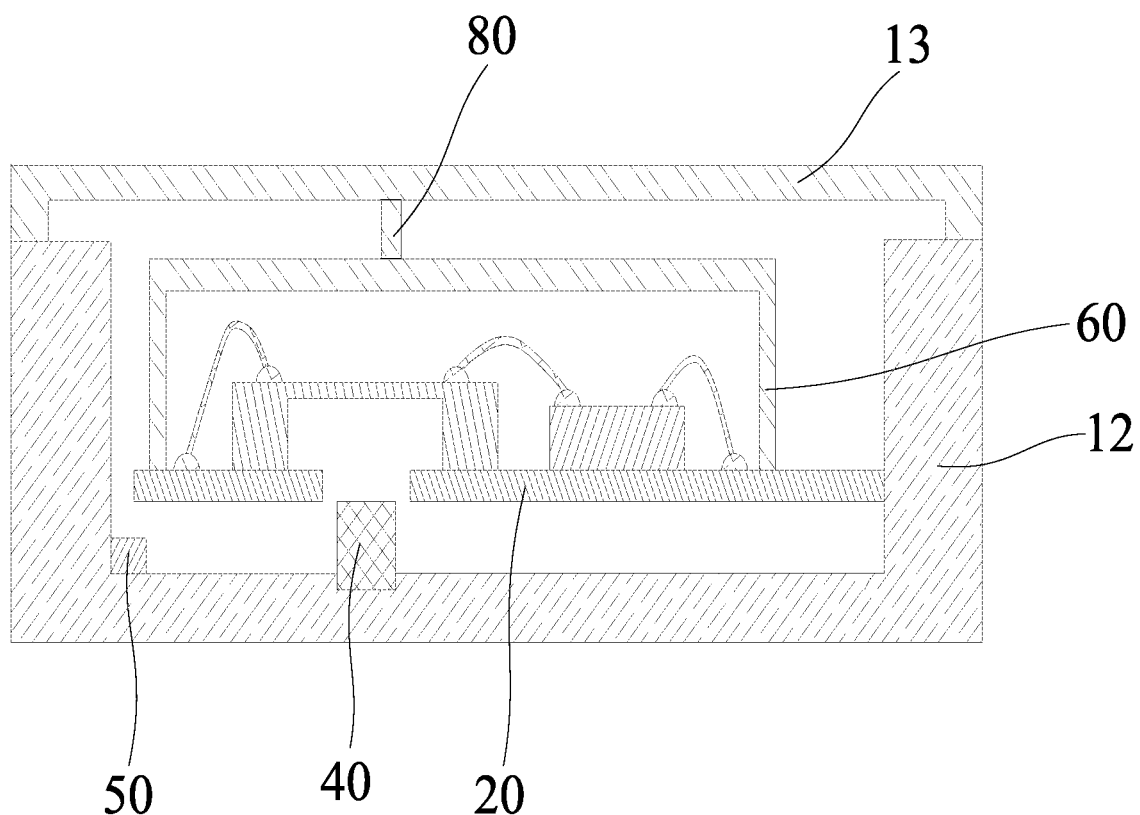
FIG. 11 is a schematic cross-sectional view of a sensor according to Embodiment 8 of the present invention.

As shown in FIG. 11, in this embodiment, a conductive pillar 80 is additionally provided based on Embodiment 1, that is, the sensor further includes the conductive pillar 80 protrudingly provided in the accommodating room 11. One end of the conductive pillar 80 connects to the inner wall of the accommodating room 11, and the other end of the conductive pillar 80 extends to and connects with the inner cover 60.

In a preferred embodiment, the conductive pillar 80 is made of metal material, or may be made of PCB (printed circuit board) material, and the conductive pillar 80 and the outer cover 13 may be integrally formed or assembled together.

In this embodiment, external vibration is transmitted to the flexible plate 20 through the conductive pillar 80, the flexible plate 20 deforms and causes air disturbances, and then the pressure sensing component 30 receives the pressure change induced by the air disturbances, wherein the air pressure change induced by the air disturbance is concentrated by the disturbance concentrator 40.

Embodiment 9 of Sensor

Figure 12:
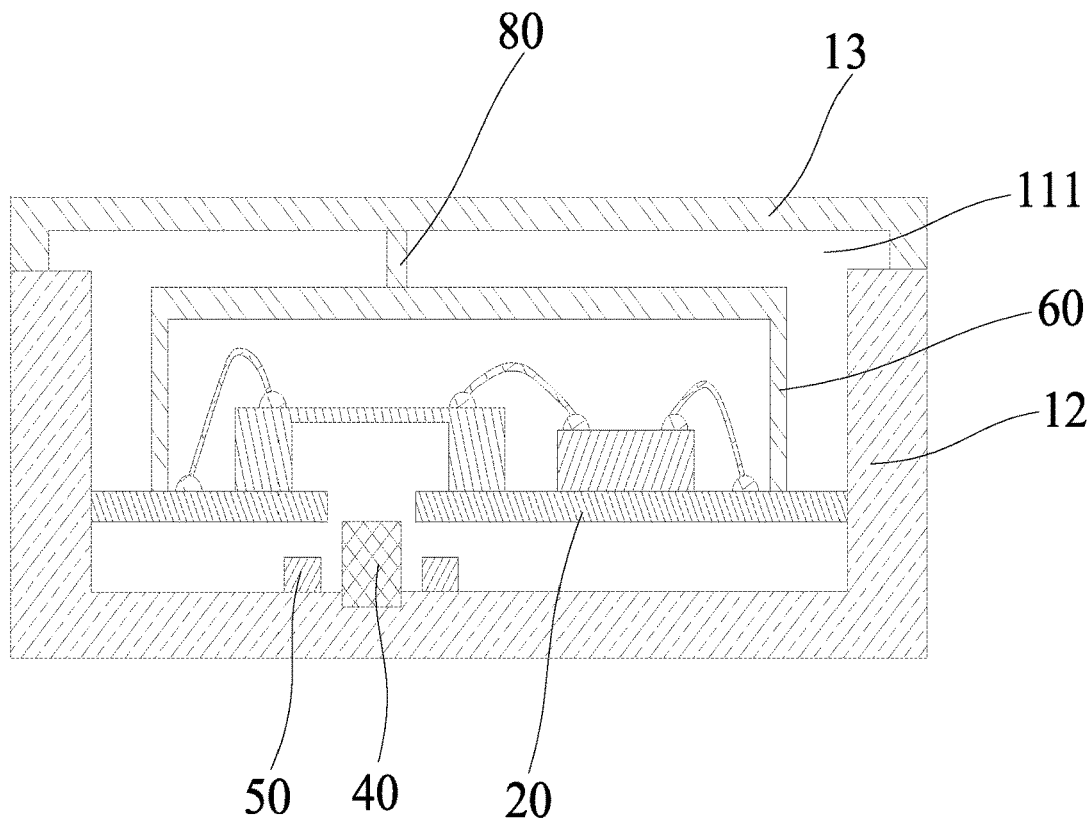
FIG. 12 is a schematic cross-sectional view of a sensor according to Embodiment 9 of the present invention.

As shown in FIG. 12, in this embodiment, a conductive pillar 80 is additionally provided based on Embodiment 2, that is, the sensor further includes the conductive pillar 80 protrudingly provided in the accommodating room 11. One end of the conductive pillar 80 connects to the inner wall of the accommodating room 11, and the other end of the pillar 80 extends to and connects with the inner cover 60, such that the vibration is transmitted from the vibration source to the inner cover 60 through the conductive pillar 80, and then transmitted to the flexible plate 20 through the inner cover 60.

The conductive pillar 80 and the outer cover 13 may be integrally formed or assembled together.

Embodiment 10 of Sensor

Figure 13:
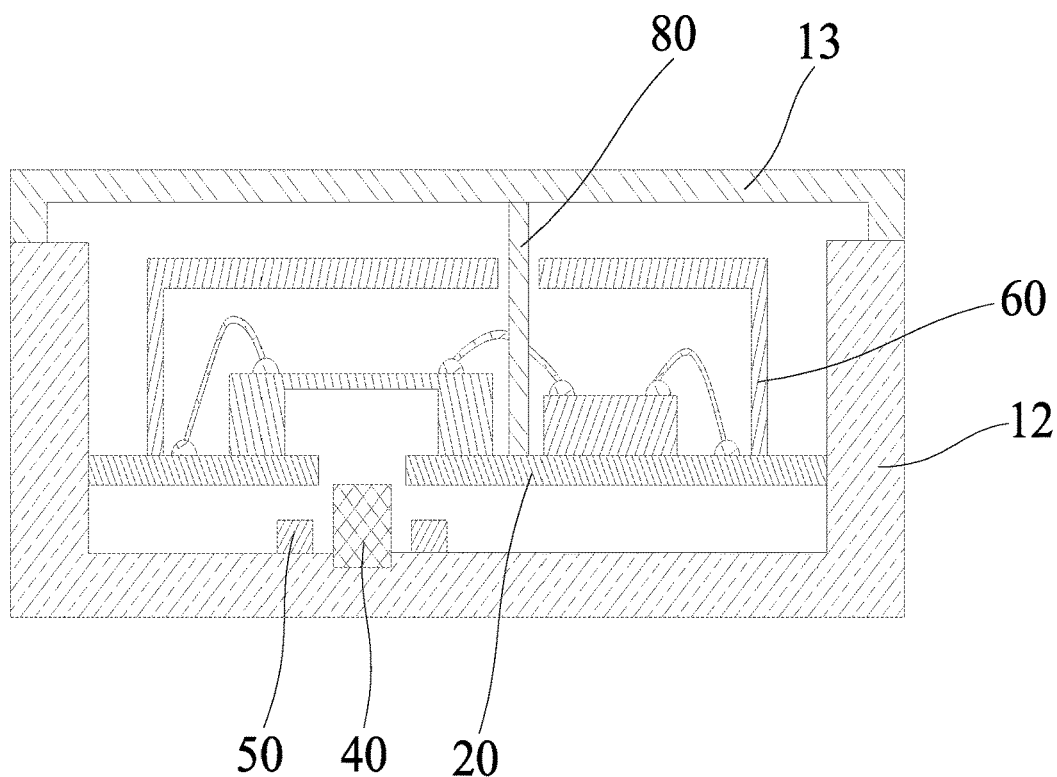
FIG. 13 is a schematic cross-sectional view of a sensor according to Embodiment 10 of the present invention.

As shown in FIG. 13, the difference of Embodiment 10 from the above-mentioned Embodiment 9 lies in that the conductive pillar 80 does not connect to the inner cover 60, but extends through the inner cover 60 and connects to the flexible plate 20. Specifically, in this embodiment, one end of the conductive pillar 80 connects to the inner wall of the accommodating room 11, and the other end of the conductive pillar 80 extends through the inner cover 60 and connects to the flexible plate 20, such that the vibration is transmitted to the outer cover 13 from the vibration source, and then transmitted to the flexible plate 20 through the conductive pillar 80.

The conductive pillar 80 and the outer cover 13 may be integrally formed, or may be assembled together.

Embodiment 11 of Sensor

Figure 14:
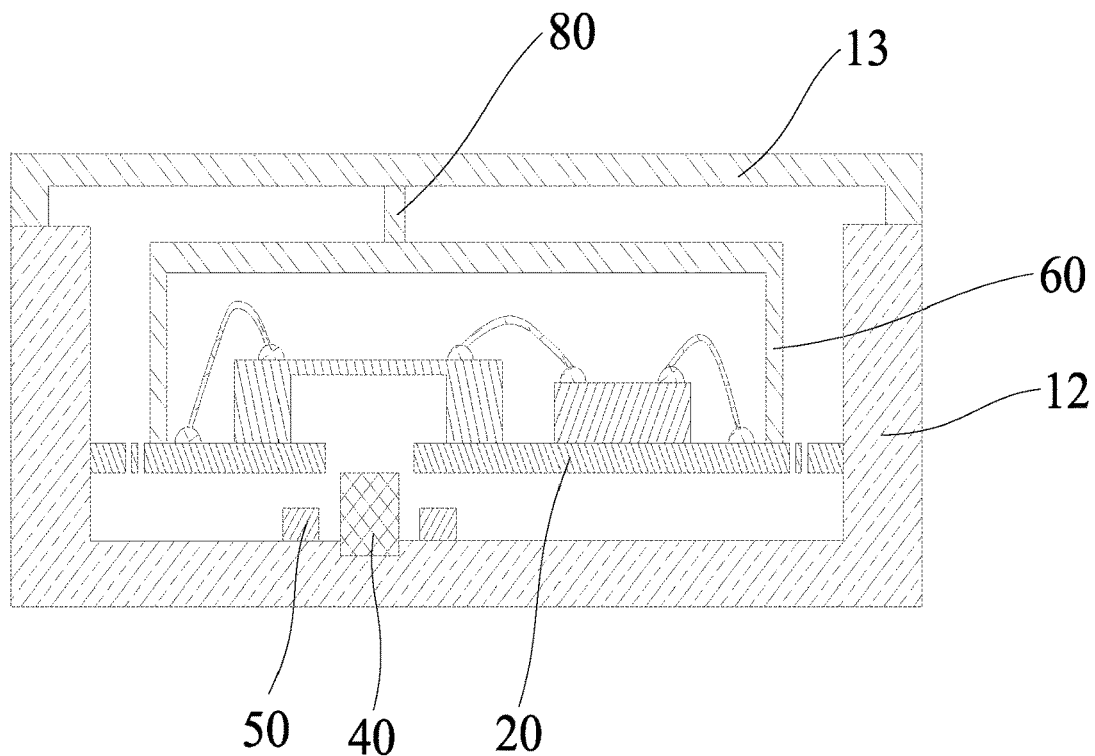
FIG. 14 is a schematic cross-sectional view of a sensor according to Embodiment 11 of the present invention.

As shown in FIG. 14, in this embodiment, a conductive pillar 80 is additionally provided based on Embodiment 3, that is, the sensor further includes the conductive pillar 80 protrudingly provided in the accommodating room 11. One end of the conductive pillar 80 connects to the inner wall of the accommodating room 11, and the other end of the conductive pillar 80 connects to the inner cover 60, such that the vibration is transmitted to the outer cover 13 from the vibration source, transmitted to the inner cover 60 through the conductive support 80, and then transmitted to the flexible plate 20 through the inner cover 60.

The conductive pillar 80 and the outer cover 13 are integrally formed, or may be assembled together.

Embodiment 12 of Sensor

Figure 15:
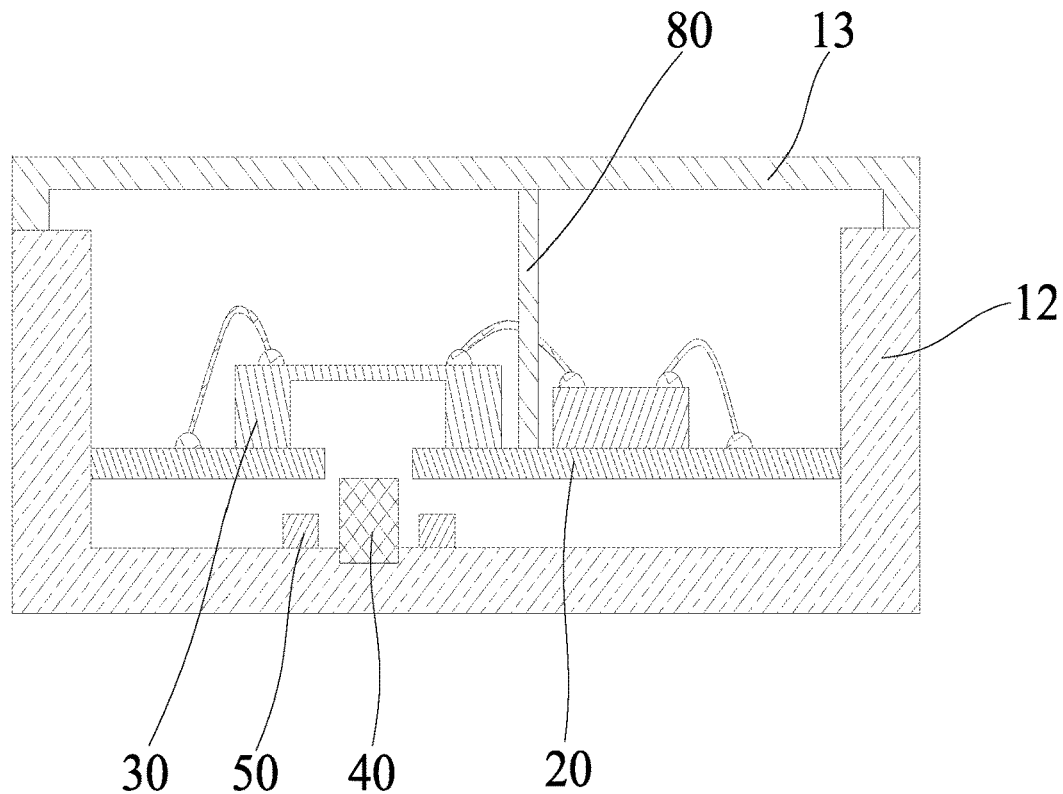
FIG. 15 is a schematic cross-sectional view of a sensor according to Embodiment 12 of the present invention.

As shown in FIG. 15, in Embodiment 12, a conductive pillar 80 is additionally provided based on Embodiment 4, that is, the sensor further includes the conductive pillar 80 protrudingly provided in the accommodating room 11. One end of the conductive pillar 80 connects to the inner wall of the accommodating room 11, and the other end of the conductive pillar 80 extends to and connects to the flexible plate 20, such that the vibration is transmitted to the outer cover 13 from the vibration source, and then transmitted to the flexible plate 20 through the conductive pillar 80.

In the sensors according to the above Embodiments 8-12, external vibration is finally transmitted to the flexible plate 20 through the conductive support 80, the flexible plate 20 deforms and causes air disturbances, and then the pressure sensing component 30 receives the pressure changes induced by the air disturbances.

The conductive pillar 80 may directly connect to the outer cover 13 or may form a gap with the outer cover 13.

Embodiment 13 of Sensor

Figure 16:
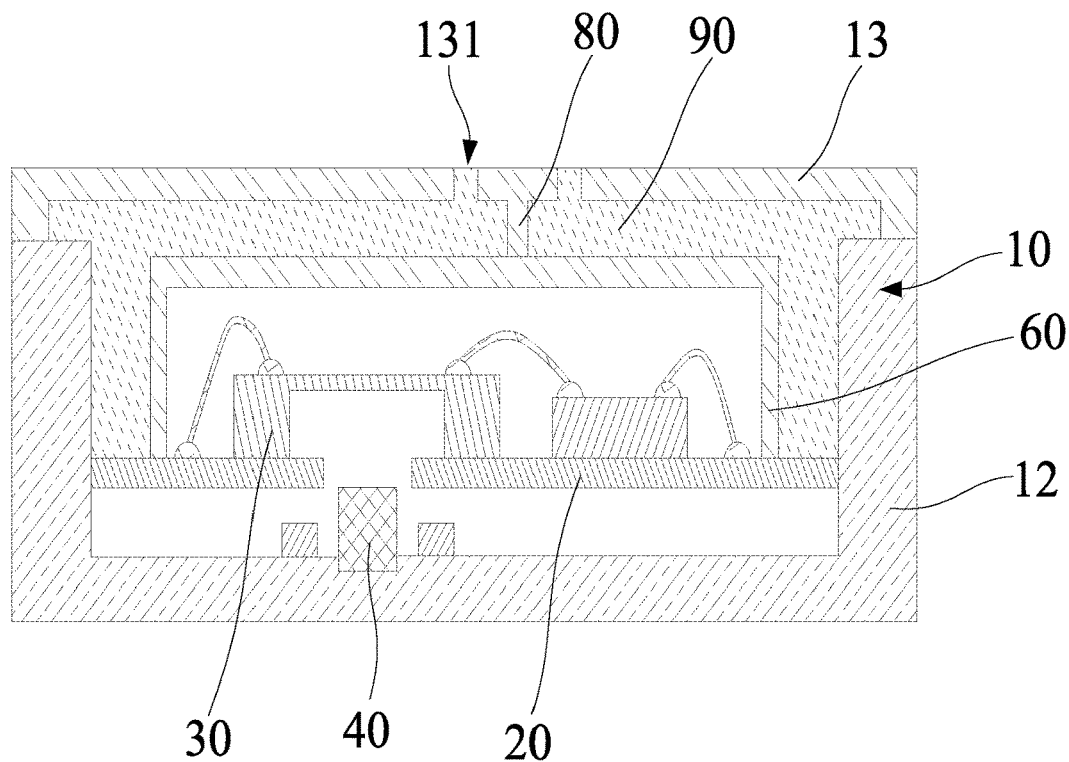
FIG. 16 is a schematic cross-sectional view of a sensor according to Embodiment 13 of the present invention.

As shown in FIG. 16, in this embodiment, the outer cover 13 and the conductive pillar 80 are provided separately and then assembled, that is, in Embodiment 13, an opening communicated with the first room 111 is additionally defined in the outer cover 13 of the housing 10 based on Embodiment 9, and the conductive pillar 80 extending from the opening is located in the first room 111. One end of the conductive pillar 80 is positioned in the opening and forms a gap 131 with the outer cover 13, such that the inner cover 60, housing 10, flexible plate 20 and conductive pillar 80 cooperatively form a filling cavity together, and the filling cavity may be filled with a soft material 90 through the gap 131. The soft material 90 is preferably a polymer material, PDMS (polydimethylsiloxane), PI (Polyimide), etc. The soft material 90 filled in the filling cavity is capable of fixing an outer edge of the flexible plate 20 so as to seal the circuit provided on the flexible plate 20 and the pressure sensing component 30.

Embodiment 14 of Sensor

Figure 17:
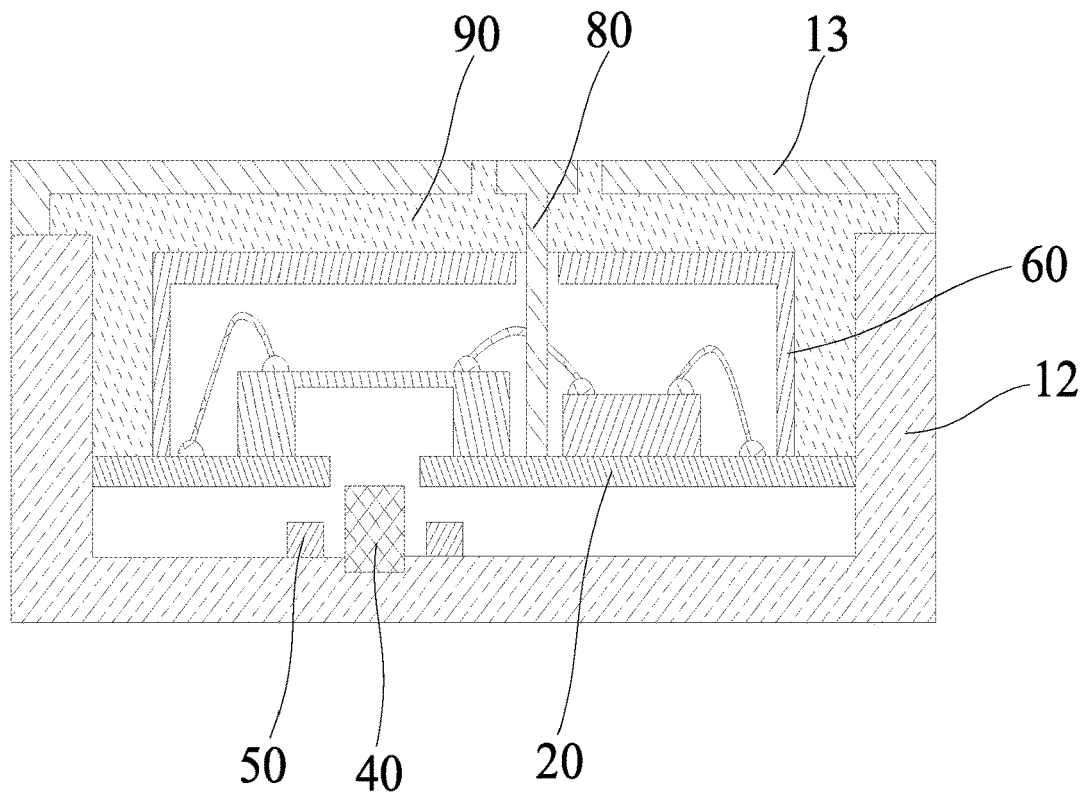
FIG. 17 is a schematic cross-sectional view of a sensor according to Embodiment 14 of the present invention.

As shown in FIG. 17, in this embodiment, the outer cover 13 and the conductive pillar 80 are provided separately and then assembled. In Embodiment 14, an opening communicating with the first room 111 is additionally defined in the outer cover 13 of the housing 10 based on Embodiment 10, and the conductive pillar 80 extending from the opening is located in the first room 111. One end of the conductive pillar 80 is positioned in the opening and forms a gap 131 with the outer cover 13, the inner cover 60, outer cover 13, base 12, flexible plate 20 and conductive pillar 80 cooperatively form a filling cavity therebetween, the opening is communicated with the filling cavity, and the filling cavity may be filled with a soft material 90 through the gap 131. The soft material 90 is preferably a polymer material, PDMS (polydimethylsiloxane), PI (Polyimide), etc. The soft material 90 filled in the filling cavity is capable of fixing an outer edge of the flexible plate 20 so as to seal the circuit provided on the flexible plate 20 and the pressure sensing component 30.

The sensors according to the above Embodiments 13-14 may be used as pressure sensors, which may be used in underwater applications or environments that require waterproofing, such as pressure gauges and underwater microphones. The pressure sensor adopts a new package technology, in which the outer cover 13 is configured to form a valve structure, and the filling cavity is filled with the soft material 90 which is capable of sealing the circuit on the flexible plate 20 and the pressure sensing component 30. The pressure difference between the inner and outer sides of the outer cover 13 will cause the flexible plate 20 to deform upward or downward. When the pressure applied on the pressure detecting component 32 by the first room 111 is increased by dP, the pressure applied on the pressure detecting component 32 by the second room 112 is decreased by dP and therefore the pressure detecting component 32 will obtain a pressure change of 2dP. According to Bernoulli's law, the air is compressed to the small-area diaphragm in the pressure detecting component 32 by the large-area flexible plate 20, which improves sensitivity of the sensor. When the pressure detecting component 32 adopts a MEMS (Micro-Electro-Mechanical System) structure, the front cavity and the back cavity of the MEMS structure can obtain twice signals.

Embodiment 15 of Sensor

Figure 18:
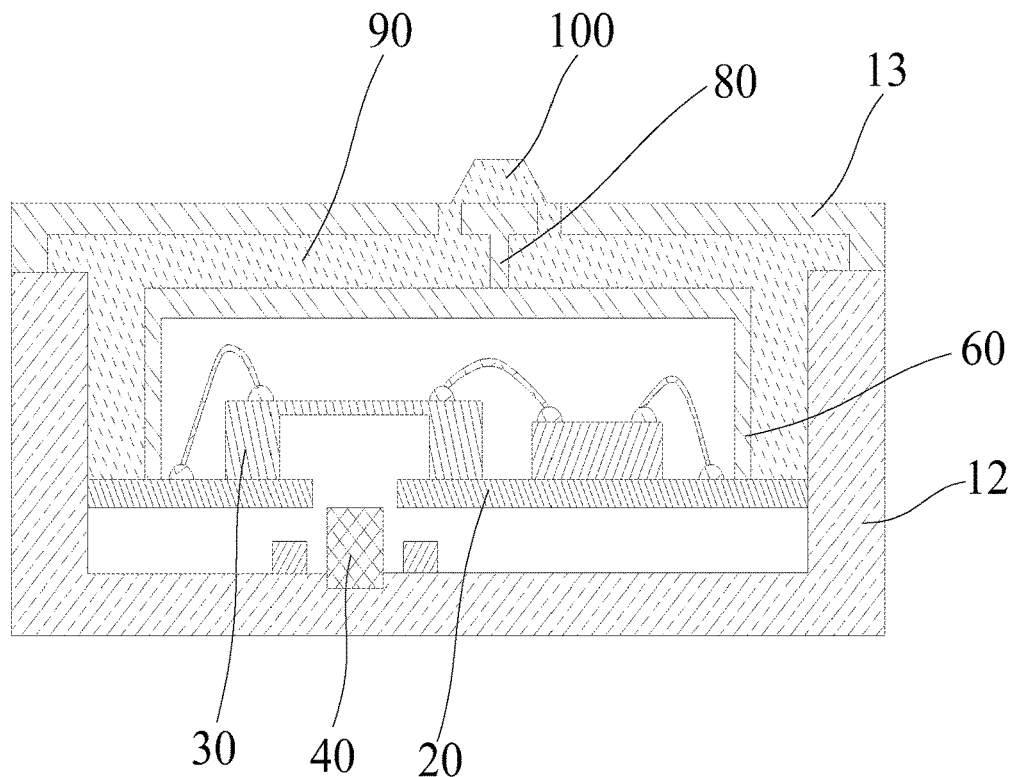
FIG. 18 is a schematic cross-sectional view of a sensor according to Embodiment 15 of the present invention.

As shown in FIG. 18, the working principle of Embodiment 15 is similar to that of the Embodiment 13, except that: in Embodiment 15, a force-bearing bump 100 is additionally provided based on Embodiment 13, that is, the sensor further includes the force-bearing bump 100. The force-bearing bump 100 is provided outside the housing 10 and faces the conductive pillar 80. The conductive pillar 80 is located inside the force-bearing bump 100 and extends from the force-bearing bump 100 into the accommodating room 11. The force exerted on the force-bearing bump 100 may be transferred to the inner cover 60 via the conductive pillar 80 and further transferred to the flexible plate 20. The force-bearing bump 100 may be integrally formed with the soft material 90 in the filling cavity.

Embodiment 16 of Sensor

Figure 19:
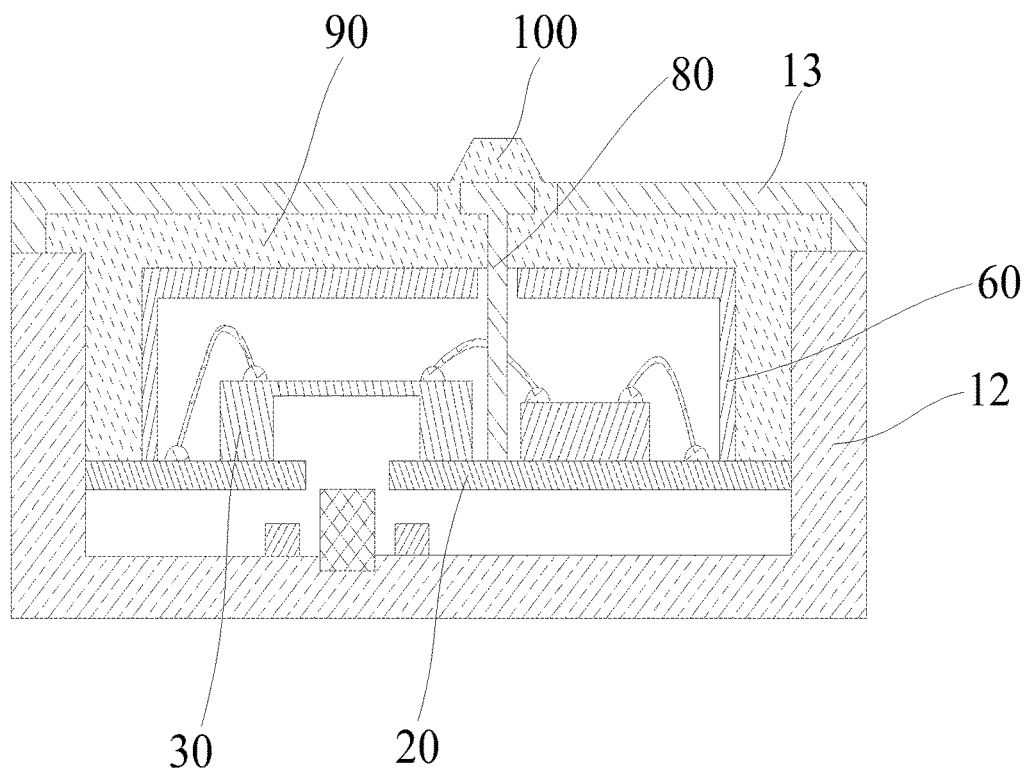
FIG. 19 is a schematic cross-sectional view of a sensor according to Embodiment 16 of the present invention.

As shown in FIG. 19, the working principle of Embodiment 16 is similar to that of Embodiment 14, except that: in Embodiment 16, a force-bearing bump 100 is additionally provided based on Embodiment 14. The arrangement and function of the force-bearing bump 100 in the Embodiment 16 are the same as those in Embodiment 15. The force exerted on the force-bearing bump 100 may be directly transmitted to the flexible plate 20 via the conductive pillar 80.

The sensors according to the above Embodiments 15-16 may be used as tactile and force sensors for sensing the force exerted on the force-bearing bump 100, and are mainly used in occasions where the pressurized area is limited.

It should be noted that, on the premise of not conflicting, any combination of the above-described embodiments or technical features may form a new embodiment. For example, the flexible plate 20 may be arranged in a cantilever beam; or, both ends are fixed to the housing 10 with the free end provided between the two fixed ends; or, the flexible plate 20 adopts a diaphragm spring structure with the outer end being fixed to the fixed end of the housing 10 and the inner end acting as the free end.

An inner cover 60 or no inner cover may be provided inside the sensor.

The accommodating room may be provided with a disturbance concentrator 40 at a position corresponding to the pressure detecting component 32, for concentrating air disturbance changes surrounding the disturbance concentrator 40. The pressure detecting component 32 performs pressure detection by collecting air pressure changes around the disturbance concentrator 40. The disturbance concentrator 40 is preferably positioned to face the through-hole 21 of the flexible plate 20 corresponding to the pressure detecting component 32. Of course, the disturbance concentrator 40 may also be positioned slightly deviating from the through-hole 21. It can be understood that, in some applications, the disturbance concentrator 40 may also be omitted.

The flexible plate 20 may be provided without the rigid member, or may be provided with the rigid member 70. The rigid member 70 may be positioned in a variety of ways. For example, the rigid member 70 may be positioned between the pressure sensing component 30 and the flexible plate 20; or the rigid member 70 may be positioned on the side of the flexible plate 20 facing away from the pressure sensing component 30; or the rigid members 70 may be respectively positioned between the pressure sensing component 30 and the flexible plate 20 and on the side of the flexible plate 20 facing away from the pressure sensing component 30.

There may be no conductive pillar or may be a conductive pillar 80 between the housing 10 and the flexible plate 20. The conductive pillar 80 may be used to transmit vibration and/or force. The conductive pillar 80 may be provided in various ways and positions. For example, the conductive pillar 80 may be provided between the housing 10 and the inner cover 60 which is fixedly connected to the flexible plate 20; or one end of the conductive pillar 80 may connect to the housing 10 and the other end thereof may extend through the inner cover 60 and then connect to the flexible plate 20; or the sensor does not include an inner cover, and the conductive pillar 80 is directly connected between the housing 10 and the flexible plate 20; the conductive pillar 80 may be integrally formed with the housing 10, or the conductive pillar 80 and the housing 10 may be formed separately and then assembled together; the conductive pillar 80 may directly connect to the housing, or a gap may be provided between the conductive pillar 80 and the housing 10, with the gap filled with sealing material.

The foregoing embodiments are only preferred embodiments of the present invention, and cannot be used to limit the scope of protection of the present invention. Any insubstantial changes and substitutions made by those skilled in the art on the basis of the present invention belong to the scope of protection claimed by the present invention.

What is claimed is:

1. A sensor, wherein the sensor comprises a housing having an accommodating room, a flexible plate that is accommodated in the accommodating room and is moveable to induce a medium pressure change in the accommodating room, and a pressure sensing component configured for sensing the medium pressure change, wherein the pressure sensing component and the flexible plate are assembled together and moveable together; and the sensor further comprises a disturbance concentrator accommodated in the accommodating room and configured for concentrating medium disturbances around the disturbance concentrator such that the pressure sensing component performs a pressure detection by collecting the medium pressure changes around the disturbance concentrator.

2. The sensor according to claim 1, wherein the pressure sensing component is electrically connected to the flexible plate; or the sensor is any one of a force sensor, a vibration sensor, a pressure gauge and an underwater sound sensor.

3. The sensor according to claim 1, wherein the housing comprises a base and an outer cover covered onto the base to define the accommodating room together, the flexible plate divides the accommodating room into a first room and a second room, such that the first room and the second room are located at opposite sides of the flexible plate.

4. The sensor according to claim 3, wherein the pressure sensing component is arranged in the first room, the disturbance concentrator is arranged in the second room, and the flexible plate is provided with a through-hole between the pressure sensing component and the disturbance concentrators to allow the pressure sensing component to collect the air pressure changes around the disturbance concentrator through the through-hole.

5. The sensor according to claim 3, wherein the sensor further comprises a conductive pillar provided in the accommodating room and configured for transmitting signal to the flexible plate, one end of the conductive pillar connects to an inner wall of the outer cover, and the other end thereof connects to the flexible plate.

6. The sensor according to claim 3, wherein the sensor further comprises an inner cover and a conductive pillar arranged in the accommodating room, the inner cover is mounted on the flexible plate and covered outside the pressure sensing component, the inner cover, outer cover and flexible plate firm a filling cavity together, the outer cover of the housing is provided with an opening communicating with the filling cavity, and one end of the conductive pillar is positioned corresponding to the opening, the other end of the conductive pillar connects to the flexible plate or the inner cover or extends through the inner cover to connect to the flexible plate, and the filling cavity is filled with a soft material.

7. The sensor according to claim 6, wherein the sensor further comprises a force-bearing bump which protrudes outside the housing at a position corresponding to the opening, and the conductive pillar extends into the accommodating room from the force-bearing bump.

8. The sensor according to claim 7, wherein the sensor further comprises an inner cover mounted on the flexible plate and covered outside the pressure sensing component, the inner cover, housing, and flexible plate cooperatively form a filling cavity, the housing is provided with an opening communicating with the filling cavity, one end of the conductive pillar is positioned corresponding to the opening, the other end of the conductive pillar connects to the inner cover or extends through the inner cover to connect to the flexible plate, and the filling cavity is filled with a soft material.

9. The sensor according to claim 3, wherein when a pressure applied on the pressure detecting component by the first room is increased by dP, the pressure applied on the pressure detecting component by the second room is decreased by dP and therefore the pressure detecting component will obtain a pressure change of 2dP.

10. The sensor according to claim 1, wherein the disturbance concentrator has a columnar shape or block shape.

11. The sensor according to claim 1, wherein the flexible plate is cantilevered in the accommodating room, such that one end of the flexible plate connects to an inner sidewall of the housing and the other end thereof is a cantilever end.

12. The sensor according to claim 11, wherein the sensor further comprises a limiter provided in the accommodating room for limiting amount of deformation of the flexible plate, and the limiter is disposed close to the cantilever end of the flexible plate and spaced from the cantilever end of the flexible plate.

13. The sensor according to claim 1, wherein both ends of the flexible plate connect to an inner sidewall of the housing; or, the flexible plate comprises a mounting portion provided in the accommodating room, a fixing portion connecting with the inner sidewall of the housing, and an elastic connecting portion elastically connected between the fixing portion and the mounting portion, the pressure sensing component being mounted on the mounting portion.

14. The sensor according to claim 13, wherein the sensor further comprises a limiter provided in the accommodating room to limit amount of deformation of the flexible plate, the mounting portion of the flexible plate is provided with a through-hole corresponding to the pressure sensing component to allow the pressure sensing component to collect the pressure changes through the through-hole, and the limiter is disposed close to an edge of the through-hole and is spaced from the edge of the through-hole.

15. The sensor according to claim 1, Wherein the sensor further comprises an inner cover provided in the accommodating room, and the inner cover is mounted on the flexible plate and is covered outside the pressure sensing component.

16. The sensor according to claim 15, wherein the sensor further comprises a conductive pillar provided in the accommodating room and configured for transmitting signal from the housing to the flexible plate, one end of the conductive pillar connects to an inner wall of the housing and the other end thereof connects to the inner cover or extends through the inner cover to connect to the flexible plate.

17. The sensor according to claim 1, wherein the sensor further comprises a rigid member, such that:
the rigid member is provided between the pressure sensing component and the flexible plate; or
the rigid member is provided on a side of the flexible plate facing away from the pressure sensing component; or
the rigid member is provided between the pressure sensing component and the flexible plate and on the side of the flexible plate facing away from the pressure sensing component, respectively.

18. The sensor according to claim 1, wherein the pressure sensing component comprises an integrated circuit chip and a pressure detecting component electrically connected to the integrated circuit chip, such that the pressure detecting component and the integrated circuit chip are mounted on the flexible plate at a distance, and the pressure detecting component and the integrated circuit chip electrically connect to the flexible plate respectively.

19. A sensor comprising:
a housing having an upper wall, a lower wall facing the upper wall, and an accommodating room formed between the upper wall and the lower wall;
a flexible plate that is provided in the accommodating room and is spaced from the upper wall and the lower wall, the flexible plate being moveable relative to the upper wall and the lower wall to induce a medium pressure change in the accommodating room, and
a pressure sensing component configured for sensing the pressure change,
wherein the pressure sensing component and the flexible plate are assembled together and moveable together; and
the sensor further comprises a conductive pillar provided in the accommodating room and configured for transmitting signal from the housing to the flexible plate.

20. A sensor comprising:
a housing having an upper wall, a lower wall facing the upper wall, and an accommodating room formed between the upper wall and the lower wall;
a flexible plate that is provided in the accommodating room and is spaced from the upper wall and the lower wall, the flexible plate being moveable relative to the upper wall and the lower wall to induce a medium pressure change in the accommodating room,
a pressure sensing component configured for sensing the medium pressure change; and
an inner cover mounted on the flexible plate with a space formed therebetween, the pressure sensing component being accommodated within the space;
wherein the pressure sensing component and the flexible plate are assembled together and moveable together.

* * * * *